Patented Mar. 2, 1937

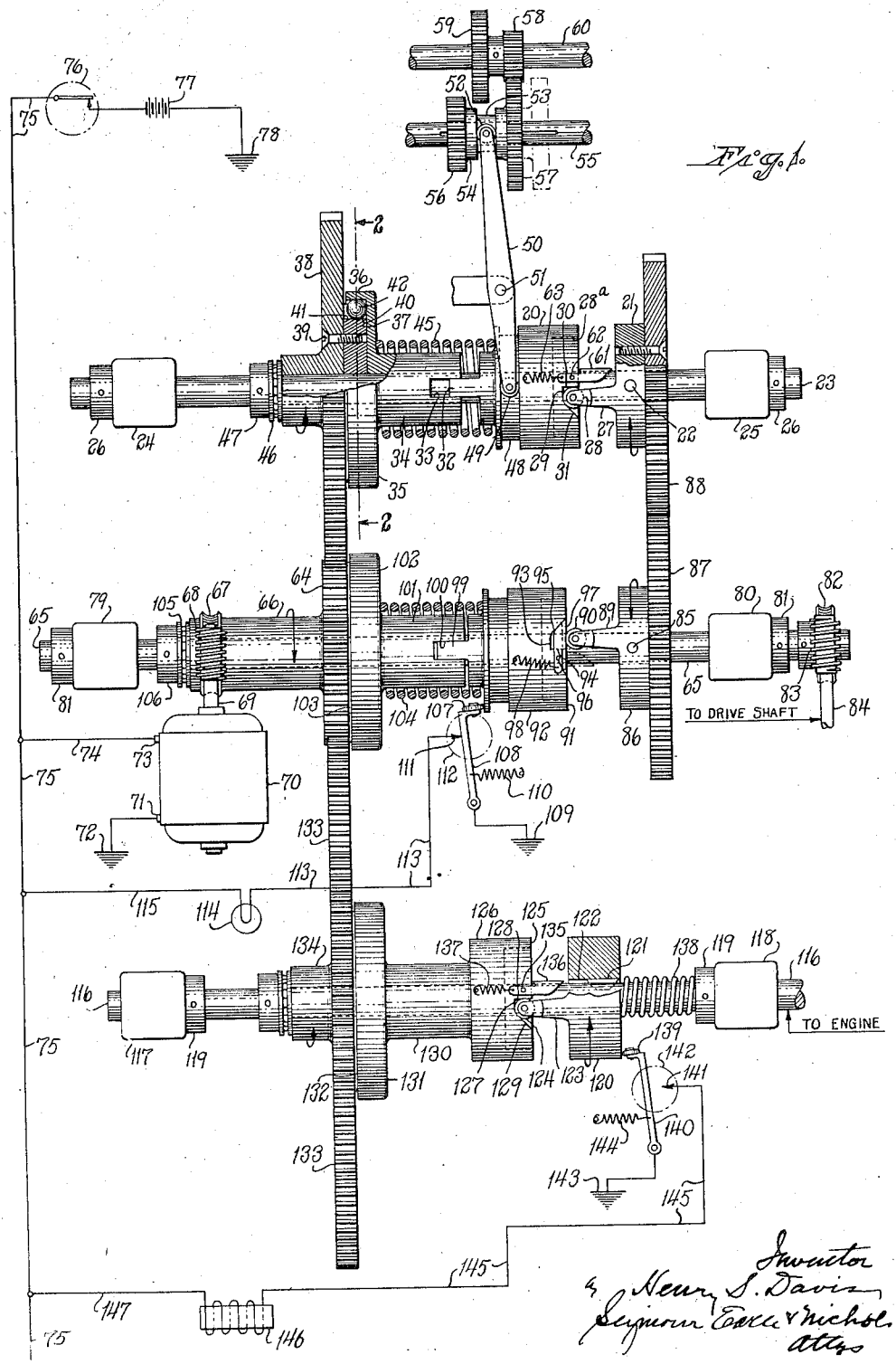

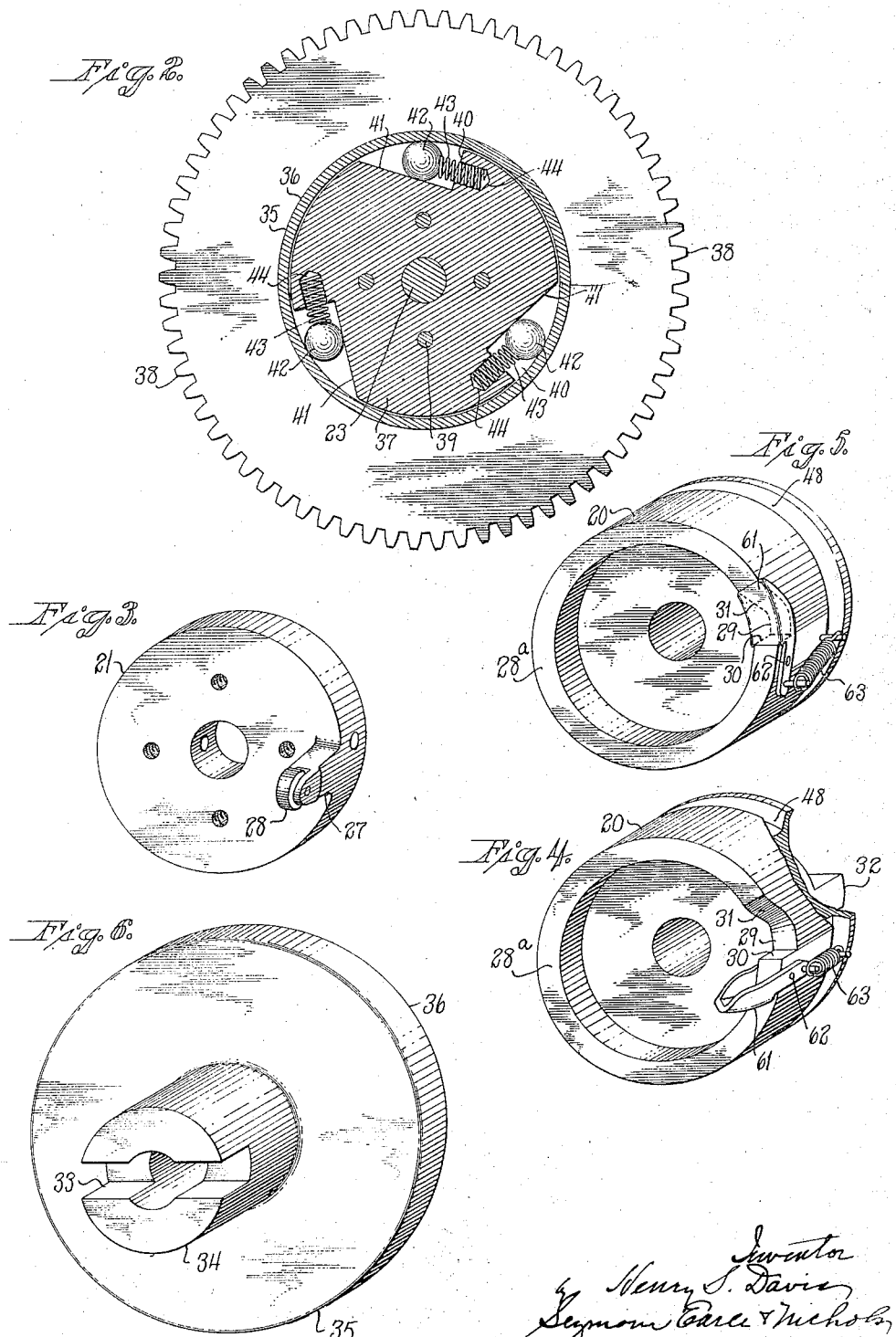

2,072,246

UNITED STATES PATENT OFFICE 2,072,246

SPEED RESPONSIVE CONTROL MECHANISM

Henry S. Davis, West Haven, Conn.

Application September 4, 1935, Serial No. 39,118

14 Claims. (Cl. 264—9)

This invention relates to improvement in control-mechanisms, and particularly to control-mechanisms which are responsive to changes in speed.

One of the objects of the present invention is to provide a superior mechanism for controlling various devices in response to speed changes and characterized by reliability, effectiveness and compactness.

A further object is to provide a superior speed-responsive control-mechanism which will respond to an effective degree to relatively-small changes in speed rates.

Another object is to provide a superior speed-responsive control-mechanism which will minimize strains at high speeds.

A still further object is to provide a speed-responsive control-mechanism which will not require high momentum for its effective operation.

Still another object is to provide a superior speed-responsive control-mechanism which will perform in a more effective manner the main functions of a centrifugal governor.

With the above and other objects in view, as will appear to those skilled in the art from the following, considered in conjunction with the accompanying drawings and appended claims, the present invention includes all features disclosed therein which are novel over the prior art.

In the accompanying drawings:

Fig. 1 is a schematic view illustrating the present invention as adapted for controlling the various features of an automobile;

Fig. 2 is a transverse sectional view taken on the line 2—2 of Fig. 1;

Fig. 3 is a perspective view of one of the control-units;

Fig. 4 is a similar view of the complementary control-unit showing its bridging-member open;

Fig. 5 is a similar view of the same, but showing its bridging-member closed; and Fig. 6 is a perspective view of one of the outer clutch-members.

The particular embodiment of the present invention herein chosen for illustration includes two complementary cooperating control-units 20 and 21 which are adapted for concurrent and relative rotation, and one at least of which is adapted for axial movement with respect to its complementary control-unit.

The control-unit 21 is rigidly secured by a pin 22 to a shaft 23 journaled adjacent its respective opposite ends in bearings 24 and 25 and held against axial displacement by means of suitable collars 26—26.

The control-unit 21 is provided with an offsetting arm 27 carrying a roller 28 coacting with the adjacent surface of the control-unit 20, before referred to. The end of the contol-unit 20 adjacent the control-unit 21 is of cup-shaped form having an annular flange 28ª formed with a notch 29 having one wall 30 extending substantially parallel with the axis of the shaft 23 and providing a driving-abutment for engagement on occasion by the roller 28. The said notch also has an inclined cam-surface 31, for the purpose as will hereinafter appear.

The control-unit 20 is mounted upon the shaft 23 with freedom for both rotary movement and axial movement with respect thereto and is driven independently of the said shaft by being provided with a coupling-tongue 32 fitting within a coupling-notch 33 formed in the hub 34 of an outer clutch-member 35, forming a part of a one-way clutch.

The outer clutch-member 35 is of cup-shaped form and includes an annular flange 36 receiving a complementary inner clutch-member 37 rigidly secured to a gear-wheel 38 in any suitable manner such, for instance, as by screws 39. The inner clutch-member is provided with a plurality of notches 40, each of which provides an outwardly-facing tangential surface 41. Intermediate the inner surface of the flange 36 of the outer clutch-member 35 and the tangential surface 41 of each of the notches 40 is interposed a ball-like coupling-member 42, pressed into engagement with the said surfaces by a helical spring 43 seated in a pocket 44 in the said inner clutch-member 37. Both of the clutch-members 35 and 37, as well as the gear-wheel 38, are mounted upon the shaft 23 with freedom for relative rotary movement with respect thereto.

Encircling the hub 34 of the outer clutch-member 35 is a helical spring 45 bearing at one end against the adjacent face of the enlarged portion of the said outer clutch-member and bearing at its opposite end against the opposing face of the control-unit 20. To prevent the spring 45 from axially displacing the clutch-members 35 and 37 and the gear-wheel 38, an antifriction thrust-bearing 46 is mounted upon the shaft 23 against the face of the gear-wheel 38 opposite the clutch-members 35 and 37. The said antifriction thrust-bearing in turn rests against a collar 47 rigidly secured in any suitable manner to the shaft 23.

The control-unit 20 is provided in its periphery with an annular groove 48 receiving a roller 49 mounted in one end of an actuating-lever 50, which is mounted for pivotal movement intermediate its respective opposite ends upon a fulcrum-pin 51. The end of the actuating-lever 50, opposite the roller 49, is provided with a roller 52 projecting into an annular groove 53 formed substantially centrally in a gear-unit 54 which may, for instance, form a feature of the transmission of an automobile. The gear-unit 54, just referred to, is keyed to a shaft 55 against relative rotary movement but with freedom for axial movement, as indicated in the upper portion of Fig. 1. At its respective opposite ends, the gear-unit 54 carries a pinion 56 and gear-wheel 57. When the gear-unit 54 is in one of its two extreme positions, the gear-wheel 57 meshes into a pinion 58 laterally spaced from and formed integral with a gear-wheel 59 and jointly therewith rigidly secured to a shaft 60. When the gear-unit 54 is shifted to the other extreme of its axial movement, as indicated by broken lines in Fig. 1, the gear-wheel 57 is moved out of engagement with the pinion 58 and the pinion 56 is moved into mesh with the gear-wheel 59.

The control-unit 20, before referred to, carries adjacent its notch 29 a bridging-member 61 having a bifurcated inner end straddling the flange 28$^a$ of the said member and pivotally secured thereto by means of a pivot-pin 62. The outer end of the said bridging-member is shaped and proportioned to substantially fully bridge over the notch 29 in the control-unit 20 when the said bridging-member is swung into the position in which it is indicated by full lines in Fig. 5. For the purpose of normally holding the bridging-member 61 in its open position in which it is indicated in Fig. 4, a helical spring 63 is employed, one end of which is attached to the said bridging-member and the opposite end of which is attached to the adjacent surface of the control-unit 20.

The gear-wheel 38, and hence the control-unit 20 which is connected thereto by the one-way clutch, which latter includes in the main the parts 35, 37 and 42, is driven in the direction indicated by the arrows in Fig. 1, by a gear-wheel 64 mounted with freedom for rotation upon a shaft 65 and meshing into the said gear-wheel 38. The hub 66 of the gear-wheel 64 has secured to it a worm-wheel 67 meshed into and driven by a worm 68 mounted upon the shaft 69 of an electric motor 70. The motor 70 has one of its terminals 71 connected to a ground 72 and its complementary terminal 73 connected by means of a wire 74 to a main-line wire 75. The main-line wire 75, just referred to, is interrupted by a switch 76 and leads from one terminal of a battery 77 having its opposite terminal connected to a ground 78.

The shaft 65 is mounted for turning movement near its respective opposite ends in suitable bearings 79 and 80, and is prevented from undue axial movement by means of collars 81—81 engaging the said bearings. Adjacent the bearing 80, the shaft 65 has secured to it a worm-wheel 82 which is meshed into and driven by a worm 83 carried by a shaft 84 which shaft may be driven by any convenient source of power such, for instance, as by the drive-shaft of an automobile.

Rigidly secured by means of a pin 85 to the shaft 65, adjacent the bearing 80, is a control-unit 86 corresponding to the control-unit 21, before referred to, and having secured to it a gear-wheel 87 which meshes into and drives a gear-wheel 88 rigidly attached to the control-unit 21 and hence rigidly attached to the shaft 23.

The control-unit 86 on the shaft 65 is provided with an offsetting arm 89 carrying a roller 90 which is adapted to ride against the adjacent edge 91 of a cup-shaped control-unit 92 corresponding to the control-unit 20, before described. Like the control-unit 20, the control-unit 92 now being described is formed with a notch 93 having one wall 94 extending substantially parallel with the axis of the unit and having a complementary wall providing an inclined cam-surface 95. Pivoted, by means of a pin 96, to the control-unit 92 is a bridging-member 97 corresponding to the bridging-member 61, before described, and adapted on occasion to have its outer end fit within the notch 93 and thus bridge the gap in the edge 91 of the said unit 92. A spring 98 normally serves to maintain the said bridging-member 97 in the position in which it is indicated by broken lines in Fig. 1.

The control-unit 92 is mounted upon the shaft 65 with freedom for relative rotary and axial movement with respect thereto and is rotated independently of the said shaft by being provided with a coupling-tongue 99 slidable longitudinally in a coupling-notch 100 formed in the hub 101 of an outer clutch-member 102. The clutch-member 102, just referred to, corresponds to the clutch-member 35, and like the same cooperates with an inner clutch-member 103 rigidly secured to the gear-wheel 64, before referred to. Encircling the hub 101 of the outer clutch-member 102 is a helical spring 104 bearing at one end against the adjacent face of the enlarged portion of the outer clutch-member 102 and at its opposite end bearing against the adjacent face of the control-unit 92, before referred to, and exerting a constant effort to maintain the said control-unit in engagement with the roller 90 of the control-unit 86.

The spring 104, just referred to, tends to slide the gear-wheel 64 and its hub 66 along the shaft 65 toward the bearing 79, and the movement referred to is guarded against by an antifriction thrust-bearing 105 which is in turn held in place by a collar 106 anchored in any suitable manner to the shaft 65.

Bearing against the face of the control-unit 92 opposite the edge 91 thereof is a roller 107 mounted on the outer end of a pivotal switch-arm 108 connected to a ground 109 and normally swung in such direction so as to engage its roller 107 with the control-unit 92 by a spring 110. The pivotal switch-arm 108 is adapted to engage with a contact 111 and together therewith may be said to provide a switch which is generally designated by the numeral 112. The contact 111, just referred to, is connected by means of a wire 113 to one terminal of a signal-lamp 114 which has its opposite terminal connected by means of a wire 115 to the main-line wire 75, before referred to.

From the foregoing, it will be seen that both of the shafts 23 and 65 are concurrently rotated from the shaft 84 and hence both of the control-units 21 and 86 are similarly driven, though in opposite directions. It will also be apparent that the motor 70 when energized will effect the concurrent rotation, though at different relative speeds, of both the control-units 20 and 92 which respectively complement and cooperate with the control-units 21 and 86, just referred to.

If desired, a third unit may be employed, which includes a shaft 116 which may be driven by any suitable means, such, for instance, as by the engine of an automobile. The said shaft 110 is mounted for rotation in spaced-apart bearings 117 and 118 and is held against axial displacement by collars 119—119 respectively engaging with the bearings 117 and 118.

Mounted upon the shaft 116 with capacity for axial movement with respect thereto is a control-unit 120 which is coupled to the said shaft for concurrent rotary movement by means of a key 121 fitting within a keyway 122. Like the control-units 21 and 86, the control-unit 120 is provided with an offsetting arm 123 carrying a roller 124 which is adapted to ride upon the adjacent edge 125 of a complementary control-unit 126. The control-unit 126 is of cup-shaped form and is provided in its edge 125 with a notch 127 having one wall 128 extending substantially parallel with the axis of the shaft 116 and also having a sloping wall 129 leading therefrom and providing a cam-surface for coaction with the roller 124.

The control-unit 126 is mounted upon the shaft 116 with freedom for rotary movement with respect thereto and its hub 130 carries at its opposite end an outer clutch-member 131 corresponding to the outer clutch-members 35 and 102 previously described, and like the same cooperating with an inner clutch-member 132 corresponding to the inner clutch-members 37 and 103 previously described. The inner clutch-member 132 is rigidly attached to a gear-wheel 133 having a hub 134 and mounted upon the shaft 116 with freedom for relative rotary movement with respect thereto. The outer and inner clutch-members 131 and 132 form the main features of a one-way clutch which will drive the control-unit 126 in the direction indicated.

The gear-wheel 133 meshes into and is driven by the gear-wheel 64 and hence by the motor 70, but at a rate of speed approximately one-third the speed at which the gear-wheel 64 rotates. The control-unit 126 has pivoted to it by means of a pin 135 a bridging-member 136 substantially corresponding to the bridging-member 97 before referred to, and adapted when swung crosswise to bridge over the notch 127 in the said unit 126. The said bridging-member is normally held in its projected position by means of a helical spring 137.

Encircling the shaft 116 is a helical spring 138 pressing at one end against the collar 119 and at its opposite end against the outer face of the control-unit 120, which latter is urged by the spring toward the control-unit 126.

Bearing against the outer face of the control-unit 120 is a roller 139 mounted on the free end of a pivotal switch-lever 140, which is adapted to cooperate with a contact 141 and provides in conjunction therewith a switch generally designated by the numeral 142. The switch-lever 140 is connected to a ground 143 and is urged in a direction to maintain its roller 139 in engagement with the control-unit 120 by a helical spring 144. The contact 141 of the switch 142 is connected by a wire 145 with one terminal of a control-magnet 146 having its opposite terminal connected by means of a wire 147 to the main-line wire 75, before described.

The control-magnet 146 may, for instance, control the clutch of an automobile and may serve to release such a clutch when energized by the closing of the switch 142, in a manner as will be hereinafter described.

For purpose of a better understanding of the mode of operation of the present invention, the speed-responsive control-mechanism associated with the shaft 23 will now be described in detail, for which purpose arbitrarily-selected revolutions per minute will be mentioned.

Let it be presumed for convenience of description that the electric motor 70, which is preferably of a constant-speed type, is effecting the turning of the gear-wheel 38 at 100 R. P. M. Now, owing to the one-way clutch, which includes the outer and inner clutch-members 35 and 37, the control-unit 20 will be turned at a corresponding rate of speed.

Let it also be presumed that the drive-shaft of an automobile is effecting the rotation of the control-unit 21 at a rate of speed less than the 100 R. P. M. at which the control-unit 20 is now being driven. Under these conditions, with the control-unit 20 moving faster than the control-unit 21, the bridging-member 61, which normally stands in the position indicated in Fig. 4, will overtake and engage the roller 28, and will be rocked thereby into the position indicated in Fig. 5. Thus, the bridging-member 61 will close the notch 29, as indicated in Fig. 5, and prevent the said roller 28 from entering the notch 29, and no axial movement of the control-unit 20 will take place under the urge of the spring 45. Thus, so long as the conditions of relative speed above referred to are maintained, the pinion 56 will be maintained in mesh with the gear-wheel 59 of the automobile transmission.

Let it now be presumed that the shaft 23 and hence the control-unit 21, is speeded up such, for instance, as by the acceleration of a vehicle, to a speed above the 100 R. P. M. at which the control-unit 20 is being rotated by the motor 70. Under these conditions, the roller 28 will advance along the edge of the flange 28ª of the said control-unit 20 and will, under the urge of the spring 45, ride down, so to speak, the cam-surface 31 of the notch 29 therein and contact with the driving-abutment 30 of the said notch. The unit 20 will now be driven by the unit 21 and at a corresponding rate of speed.

It will be understood that the control-unit 21 will be permitted to drive the control-unit 20 at a greater rate of speed than the speed of the gear-wheel 38 which normally drives the latter owing to the action of the one-way clutch which comprises in the main, as before noted, the outer and inner clutch-members 35 and 37. Under the condition just recited, the outer clutch-member 35 will freely ride ahead of the inner clutch-member, owing to the retirement of the balls 42 in the usual manner of one-way clutches of this type.

As the roller 28 of the control-unit 21 enters the notch 29, as just above described, the said control-unit 20 will move outwardly toward the control-unit 21 under the urge of the spring 45, with the effect of rocking the actuating-lever 50 to a degree sufficient to de-mesh the pinion 56 from the gear-wheel 59 and mesh the gear-wheel 57 with the pinion 58. This movement will restore the pinions and gears 56 to 59 inclusive into the relationships in which they are shown in Fig. 1.

Now in the event that the speed of the control-unit 21 falls below the speed of the gear-wheel 38, the control-unit 20 will be moved ahead of the complementary control-unit 21 by the said gear-wheel, thereby causing the roller 28 to in effect ride up the sloping wall or cam-surface 31, thus in turn causing the control-unit 20 to move away from the control-unit 21 against the counter-urge of the spring 45. This movement will serve to again de-mesh the gear-wheel 57 from the pinion 58 and mesh the pinion 56 with the gear-wheel 59.

From the foregoing, it will be seen that by means of the present invention a very slight differential in speed between two members will effect a movement which may be utilized for controlling any suitable mechanism. Thus, for instance, should the control-unit 21 exceed the speed of the control-unit 20 by but a fractional part of one revolution, the said control-unit 20 will be shifted from left to right by the spring 45 which is permitted to act by the entry of the roller 28 into the notch 29.

Conversely, when the speed of the control-unit 21 falls below the speed at which the control-unit 20 is normally driven by the minutest fraction of a revolution, the control-unit 20 will be moved from right to left by the coaction of the cam-surface 31 with the roller 28, and the said units will be maintained in these relatively-separated positions by the action of the bridging-member 61 which will move into position to provide a bridge, so to speak, across the notch 29 each time the said notch overtakes the roller 28 of the more slowly moving unit 21.

Thus, by means of the present invention, a very slight difference in speed will effect just as much movement, which may be utilized for controlling any desired mechanism, as would any great difference in speed. The advantageous action just referred to may be contrasted with the action of a speed-responsive mechanism of the centrifugal type in which a great degree of inertia is required and in which slight changes in speed effect a relatively-slight movement which is difficult to utilize effectively, and in which a great change of speed effects a relatively-greater movement.

With regard to the speed-responsive control-mechanism which is mounted upon the shaft 65, it is sufficient to say that its action generally corresponds to the mechanism before referred to associated with the shaft 23. For instance, when the speed of the control-unit 86 is less than that of the control-unit 92, the said units will occupy the relationships in which they are indicated in Fig. 1, wherein the said control-unit 92 is most widely separated from the control-unit 86, in which position the switch 112 will be closed to thus energize the signal-lamp 114. Under the conditions just recited, the bridging-member 97 will serve the same purpose as that previously described in connection with the bridging-member 61. When the speed of the control-unit 86 exceeds the speed of the complementary control-unit 92, the latter will be moved toward the former by the spring 104 and effect the opening of the switch 112.

With respect to the speed-responsive control-mechanism associated with the shaft 116, it is sufficient to say that the parts will occupy the relative relationships in which they are indicated in Fig. 1 when the speed of the control-unit 120 exceeds the speed at which the gear-wheel 133 is being driven by the motor 70. When, however, the speed of the control-unit 120 falls below the speed at which the control-unit 126 is normally driven by the gear-wheel 133, the said unit 120 will be moved away from the unit 126 by the coaction of the roller 124 with the sloping wall 129. This movement will effect the closing of the switch 142 and thus energize the control-magnet 146 which in turn may, for instance, effect the releasing of the clutch of an automobile.

The invention may be carried out in other specific ways than those herein set forth without departing from the spirit and essential characteristics of the invention, and the present embodiments are therefore to be considered in all respects as illustrative and not restrictive, and all changes coming within the meaning and equivalency range of the appended claims are intended to be embraced therein.

I claim:
1. A speed-responsive control-device including in combination: two coacting rotary control-units, one at least of which is axially movable toward and away from the other; driving-means serving to rotate the said control-units but at varying relative speeds; one of the said control-units being provided with a cam-surface and the other control-unit being provided with a portion coacting with the said cam-surface and serving in conjunction therewith, when the speed of one control-unit exceeds that of the other, to effect the axial movement of one of the said control-units with respect to the other; means controlled by the relative rotary movement between the two said control-units and serving to render the cam-surface of one of said control-units continuously ineffective during a series of complete revolutions of one control-unit with respect to the other; and a controlled-device operatively associated with the axially-movable control-unit for being actuated by the axial movement thereof.

2. A speed-responsive control-device including in combination: two coacting rotary control-units, one at least of which is axially movable toward and away from the other; driving-means serving to rotate the said control-units but at varying relative speeds; one of the said control-units being provided with a cam-surface and the other control-unit being provided with a portion coacting with the said cam-surface and serving in conjunction therewith, when the speed of one control-unit exceeds that of the other, to effect the axial movement in one direction of one of the said control-units with respect to the others; yielding means serving to move the axially-movable control unit in a direction opposite to that in which it is moved as aforesaid; means controlled by the relative rotary movement between the two said control-units and serving to render the cam-surface of one of said control-units continuously ineffective during a series of complete revolutions of one control-unit with respect to the other; and a controlled-device operatively associated with the axially-movable control-unit for being actuated by the axial movement thereof.

3. A speed-responsive control-device including in combination: two coacting rotary control-units, one at least of which is axially movable toward and away from the other; driving-means serving to rotate the said control-units but at varying relative speeds; one of the said control-units being provided with a cam-surface and the other control-unit being provided with a portion coacting with the said cam-surface and serving in conjunction therewith, when the speed of one control-unit exceeds that of the other, to effect the axial movement of one of the said control-units with respect to the other; means controlled by the relative rotary movement between the two said control-units and serving to render the cam-surface of one of said control-units continuously ineffective during a series of complete revolutions of one control-unit with respect to the other; spring means exerting a constant effort to shift the means just above referred to into a retired position to permit the cam-surface of one of said control-units to be effective; and a controlled-device operatively associated with the axially-movable control-unit for being actuated by the axial movement thereof.

4. A speed-responsive control-device including in combination: two coacting rotary control-units, one at least of which is axially movable toward and away from the other; driving-means serving to rotate the said control-units but at varying relative speeds; one of the said control-units being provided with a cam-surface and the other control-unit being provided with a portion coacting with the said cam-surface and serving in conjunction therewith, when the speed of one control-unit exceeds that of the other, to effect the axial movement of one of the said control-units with respect to the other; a retirable bridging-member controlled by the relative rotary movement between the two said control-units and adapted to bridge over the cam-surface of one of the said control-units to render the said cam-surface ineffective; and a controlled-device operatively associated with the axially-movable control-unit for being actuated by the axial movement thereof.

5. A speed-responsive control-device including in combination: two coacting rotary control-units, one at least of which is axially movable toward and away from the other; driving-means serving to rotate the said control-units but at varying relative speeds; one of the said control-units being provided with a cam-surface and the other control-unit being provided with a portion coacting with the said cam-surface and serving in conjunction therewith, when the speed of one control-unit exceeds that of the other, to effect the axial movement of one of the said control-units with respect to the other; a retirable bridging-member controlled by the relative rotary movement between the two said control-units and adapted to bridge over the cam-surface of one of the said control-units to render the said cam-surface ineffective; spring-means exerting a constant effort to retire the said bridging-member; and a controlled-device operatively associated with the axially-movable control-unit for being actuated by the axial movement thereof.

6. A speed-responsive control-device including in combination: two coacting rotary control-units, one at least of which is axially movable toward and away from the other; driving-means serving to rotate the said control-units but at varying relative speeds; one of the said control-units being provided with a cam-surface and the other control-unit being provided with a portion coacting with the said cam-surface and serving in conjunction therewith, when the speed of one control-unit exceeds that of the other, to effect the axial movement of one of the said control-units with respect to the other; a swinging bridging-member pivoted to the control-unit having the aforesaid cam-surface rockable into position to bridge over the said cam-surface by the relative rotary movement between the two said control-units; and a controlled-device operatively associated with the axially-movable control-unit for being actuated by the axial movement thereof.

7. A speed-responsive control-device including in combination: two coacting rotary control-units, one at least of which is axially movable toward and away from the other; driving-means serving to rotate the said control-units but at varying relative speeds; one of the said control-units being provided with a cam-surface and the other control-unit being provided with a portion coacting with the said cam-surface and serving in conjunction therewith, when the speed of one control-unit exceeds that of the other, to effect the axial movement of one of the said control-units with respect to the other; a swinging bridging-member pivoted to the control-unit having the aforesaid cam-surface movable into position to bridge over the said cam-surface by the relative rotary movement between the two said control-units; spring-means exerting a constant effort to swing the said bridging-member into its retired position; and a controlled-device operatively associated with the axially-movable control-unit for being actuated by the axial movement thereof.

8. A speed-responsive control-device including in combination: two coacting rotary control-units, one at least of which is axially movable toward and away from the other; driving-means serving to rotate the said control-units but at varying relative speeds; one of the said control-units being provided with a cam-surface and the other control-unit being provided with a portion coacting with the said cam-surface and serving in conjunction therewith, when the speed of one control-unit exceeds that of the other, to effect the axial movement in one direction of one of the said control-units with respect to the other; yielding-means serving to move the axially-movable control-unit in a direction opposite to that in which it is moved as aforesaid; a swinging bridging-member pivoted to the control-unit having the aforesaid cam-surface movable into position to bridge over the said cam-surface by the relative rotary movement between the two said control-units; and a controlled-device operatively associated with the axially-movable control-unit for being actuated by the axial movement thereof.

9. A speed-responsive control-device including in combination: a first rotary control-unit; driving-means for the said first control-unit; a second rotary control-unit mounted for rotation substantially coaxially with respect to the said first control-unit; driving-means for driving the said second control-unit at speed rates both slower and faster than the speed at which the said first control-unit is normally driven; at least one of the said control-units being axially movable toward and away from the other and one thereof being provided with a cam-surface and a driving-abutment, and the other of said control-units being provided with means coacting with said cam-surface and the said driving-abutment and serving in conjunction therewith to effect the axial movement of one of said control-units when the speed of one thereof is less than that of the other, and to cause one of the said control-units to drive the other when the speed ratio between the two said units is reversed; means controlled by the relative movement between the said two control-units and serving to render the cam-surface of one of said control-units continuously ineffective during a series of complete revolutions of one control-unit with respect to the other; and a controlled-device operatively associated with the axially-movable control-unit for being actuated by the axial movement thereof.

10. A speed-responsive control-device including in combination: a first rotary control-unit; driving-means for the said first control-unit; a second rotary control-unit mounted for rotation substantially coaxially with respect to the said first control-unit; driving-means for driving the said second control-unit at speed rates both slower and faster than the speed at which the said first control-unit is normally driven; at least one of the said control-units being axially movable toward and away from the other and one thereof being provided with a cam-surface and a driving-abutment, and the other of said control-units being provided with means coacting with said cam-surface and the said driving-abutment and serving in conjunction therewith to effect the axial movement of one of said control-units in one direction when the speed of one thereof is less than that of the other, and to cause one of the said control-units to drive the other when the speed ratio between the two said units is reversed; yielding means serving to axially shift the axially-movable control-unit in a direction opposite that in which it is moved by the said cam-surface as aforesaid; means controlled by the relative movement between the said two control-units and serving to render the cam-surface of one of said control-units continuously ineffective during a series of complete revolutions of one control-unit with respect to the other; and a controlled-device operatively associated with the axially-movable control-unit for being actuated by the axial movement thereof.

11. A speed-responsive control-device including in combination: a first rotary control-unit; driving-means for the said first control-unit; a one-way clutch interposed between the said driving-means and the said first control-unit and permitting the said control-unit to be speeded up and operated faster than the speed at which it would be normally driven by the said driving-means; a second rotary control-unit mounted for rotation substantially coaxially with respect to the said first control-unit; driving-means for driving the said second control-unit at speed rates both slower and faster than the speed at which the said first control-unit is normally driven; at least one of the said control-units being axially movable toward and away from the other and one thereof being provided with a cam-surface and the other thereof being provided with a portion coacting with the said cam-surface and serving in conjunction therewith to effect the axial movement of one of the said control-units; means controlled by the relative movement between the two said control-units and serving to render the cam-surface of one of said control-units continuously ineffective during a series of complete revolutions of one control-unit with respect to the other; and a controlled-device operatively associated with the axially-movable control-unit for being actuated by the axial movement thereof.

12. A speed-responsive control-device including in combination: a first rotary control-unit; driving-means for the said first control-unit; a one-way clutch interposed between the said driving-means and the said first control-unit and permitting the said control-unit to be speeded up and operated faster than the speed at which it would be normally driven by the said driving-means; a second rotary control-unit mounted for rotation substantially coaxially with respect to the said first control-unit; driving-means for driving the said second control-unit at speed rates both slower and faster than the speed at which the said first control-unit is normally driven; at least one of the said control-units being axially movable toward and away from the other and one thereof being provided with a cam-surface and the other thereof being provided with a portion coacting with the said cam-surface and serving in conjunction therewith to effect the axial movement of one of the said control-units in one direction; yielding means serving to move the axially-movable control-unit in a direction opposite to that in which it is moved as aforesaid; means controlled by the relative rotary movement between the two said control-units and serving to render the cam-service of one of said control-units continuously ineffective during a series of complete revolutions of one control-unit with respect to the other; and a controlled-device operatively associated with the axially-movable control-unit for being actuated by the axial movement thereof.

13. A speed-responsive control-device including in combination: a first rotary control-unit; driving-means for the said first control-unit; a one-way clutch interposed between the said driving-means and the said first control-unit and permitting the said control-unit to be speeded up and operated faster than the speed at which it would be normally driven by the said driving-means; a second rotary control-unit mounted for rotation substantially coaxially with respect to the said first control-unit; driving-means for driving the said second control-unit at speed rates both slower and faster than the speed at which the said first control-unit is normally driven; at least one of the said control-units being axially movable toward and away from the other and one thereof being provided with a cam-surface and the other thereof being provided with a portion coacting with the said cam-surface and serving in conjunction therewith to effect the axial movement of one of the said control-units; a retirable bridging-member controlled by the relative rotary movement between the two said control-units and adapted to bridge over the cam-surface of one of the said control-units to render the said cam-surface ineffective; spring-means exerting a constant effort to retire the said bridging-member; and a controlled-device operatively associated with the axially-movable control-unit for being actuated by the axial movement thereof.

14. A speed-responsive control-device including in combination: a first rotary control-unit; driving-means for the said first control-unit; a one-way clutch interposed between the said driving-means and the said first control-unit and permitting the said control-unit to be speeded up and operated faster than the speed at which it would be normally driven by the said driving-means; a second rotary control-unit mounted for rotation substantially coaxially with respect to the said first control-unit; driving-means for driving the said second control-unit at speed rates both slower and faster than the speed at which the said first control-unit is normally driven; at least one of the said control-units being axially movable toward and away from the other and one thereof being provided with a cam-surface and the other thereof being provided with a portion coacting with the said cam-surface and serving in conjunction therewith to effect the axial movement of one of the said control-units; a swinging bridging-member pivoted to the control-unit having the aforesaid cam-surface rockable into position to bridge over the said cam-surface by the relative rotary movement between the two said control-units; and a controlled-device operatively associated with the axially-movable control-unit for being actuated by the axial movement thereof.

HENRY S. DAVIS.